US012228189B2

(12) United States Patent
Dong et al.

(10) Patent No.: US 12,228,189 B2
(45) Date of Patent: Feb. 18, 2025

(54) SELF-SENSING AND SEPARATED DUAL-CYLINDER MAGNETORHEOLOGICAL DAMPER

(71) Applicant: CHONGQING UNIVERSITY, Chongqing (CN)

(72) Inventors: Xiaomin Dong, Chongqing (CN); Xianyu Song, Chongqing (CN); Jianqiang Yu, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 393 days.

(21) Appl. No.: 17/824,053

(22) Filed: May 25, 2022

(65) Prior Publication Data

US 2022/0290732 A1 Sep. 15, 2022

Related U.S. Application Data

(63) Continuation of application No. PCT/CN2020/130727, filed on Nov. 23, 2020.

(30) Foreign Application Priority Data

Nov. 26, 2019 (CN) .......................... 201911176651.5

(51) Int. Cl.
*F16F 9/53* (2006.01)
*F16F 9/18* (2006.01)
*F16F 9/58* (2006.01)

(52) U.S. Cl.
CPC .............. *F16F 9/537* (2013.01); *F16F 9/185* (2013.01); *F16F 9/58* (2013.01); *F16F 2222/06* (2013.01); *F16F 2224/045* (2013.01)

(58) Field of Classification Search
CPC .... F16F 9/58; F16F 9/185; F16F 9/348; F16F 9/535; F16F 9/537; F16F 2222/06; F16F 2224/045; F16F 2230/20; B60G 2600/26
(Continued)

(56) References Cited

U.S. PATENT DOCUMENTS 6,131,709 A * 10/2000 Jolly .......................... F16F 9/20
60/326
9,939,080 B2 * 4/2018 Alred .................... F15B 21/065
(Continued)

FOREIGN PATENT DOCUMENTS

CN 104819242 A 8/2015
CN 105805218 A 7/2016
(Continued)

OTHER PUBLICATIONS

English machined translation of KR-20020046006, Jun. 20, 2002.*
(Continued)

*Primary Examiner* — Robert A. Siconolfi
*Assistant Examiner* — San M Aung
(74) *Attorney, Agent, or Firm* — Edell, Shapiro & Finnan, LLC

(57) ABSTRACT

A self-sensing and separated dual-cylinder magnetorheological damper includes a first piston cylinder and a second piston cylinder which are in angular communication with each other. The first piston cylinder includes a piston inner cylinder and a piston outer cylinder which together with the second piston cylinder form a magnetorheological fluid circulation channel. The piston inner cylinder is provided with a piston rod assembly reciprocating in an axial direction of the piston inner cylinder, and when the piston rod assembly is compressed and restored, the magnetorheological liquid correspondingly forms a first circulation loop and a second circulation loop respectively. The second piston cylinder is provided therein with a magnetorheological liquid adjustment mechanism for forming the first circulation loop and the second circulation loop. Independent control of damping force values in compression and restoration working conditions can be achieved by means of different circulation channels of the magnetorheological liquid.

10 Claims, 7 Drawing Sheets

(58) Field of Classification Search
USPC .................................................... 188/267.2
See application file for complete search history.

(56) References Cited

U.S. PATENT DOCUMENTS

| | | | | |
|---|---|---|---|---|
| 2004/0195062 | A1* | 10/2004 | Anderfaas ............... | F16F 9/535 |
| | | | | 188/267.2 |
| 2009/0294231 | A1* | 12/2009 | Carlson ................... | F16F 9/535 |
| | | | | 188/267.2 |
| 2014/0138195 | A1* | 5/2014 | Anderfaas ............... | F16F 9/535 |
| | | | | 188/267.2 |

FOREIGN PATENT DOCUMENTS

| | | |
|---|---|---|
| CN | 205663810 U | 10/2016 |
| CN | 206159354 U | 5/2017 |
| CN | 107701645 A | 2/2018 |
| CN | 110925349 A | 3/2020 |
| EP | 1908985 A1 | 4/2008 |
| KR | 20020046006 A | 6/2002 |

OTHER PUBLICATIONS

International Search Report and Written Opinion in counterpart International Application No. PCT/CN2020/130727, mailed Feb. 23, 2021, 6 pages.

* cited by examiner ns SELF-SENSING AND SEPARATED DUAL-CYLINDER MAGNETORHEOLOGICAL DAMPER

CROSS REFERENCE TO RELATED APPLICATIONS

This patent application is a continuation of International Application No. PCT/CN2020/130727, filed on Nov. 23, 2020, which claims the benefit and priority of Chinese Patent Application No. 201911176651.5 filed on Nov. 26, 2019; both of the aforementioned applications are hereby incorporated by reference in their entireties.

TECHNICAL FIELD

The present disclosure relates to the field of mechanical vibration reduction, particularly a self-sensing and separated dual-cylinder magnetorheological damper.

BACKGROUND ART

The compression damping force and rebound damping force of the existing passive vibration damping device cannot be adaptively adjusted according to the working conditions. In order to improve the controllable damping characteristics, magnetorheological dampers that can output semi-active damping have been developed and used. However, the control algorithm of the traditional magnetorheological damper is relatively complex, and it is difficult for the traditional magnetorheological damper to output large damping in some limited spaces. Furthermore, although the response time of the magnetorheological fluid is short, the response time of the magnetorheological damper will have a certain influence on the control of the magnetorheological fluid due to the existence of the magnetic field generator and the controller.

Therefore, it is necessary to provide a self-sensing and separated dual-cylinder magnetorheological damper, which can reduce the damper's requirements on the response time, reduce the difficulty of the damper control algorithm, and improve the actual control effect of the damper, through independently controlling the compression damping force and the rebound damping force.

SUMMARY

In view of this, the present disclosure provides a self-sensing and separated dual-cylinder magnetorheological damper, which can achieve independent control of damping force values in compression and restoration working conditions by means of circulation flow of the magnetorheological liquid between the inner channel and the outer channel, and which can detect vibration amplitudes and speeds of the working conditions by means of a design of a self-sensing LVDT structure away from magnetorheological coils, so as to provide a basis for adjusting the damping force of the damp.

A self-sensing and separated dual-cylinder magnetorheological damper includes a first piston cylinder and a second piston cylinder which are angularly arranged and in communication with each other. The first piston cylinder includes a piston inner cylinder and a piston outer cylinder which are coaxially provided, the piston inner cylinder, the piston outer cylinder and the second piston cylinder are formed with a magnetorheological fluid circulation channel for circulating magnetorheological fluid. The piston inner cylinder is provided with a piston rod assembly reciprocating in an axial direction of the piston inner cylinder, the magnetorheological liquid forms a first circulation loop when the piston rod assembly is compressed and a second circulation loop respectively when the piston rod assembly is restored, a magnetorheological liquid adjustment mechanism for forming the first circulation loop and the second circulation loop is provided within the second piston cylinder.

Further, the magnetorheological fluid adjustment mechanism includes a magnetic isolation sleeve fixedly arranged in a middle of the second piston cylinder, a first channel arranged within the magnetic isolation sleeve, a second channel disposed in the magnetic isolation sleeve, a third channel disposed in the magnetic isolation sleeve, and a fourth channel disposed in the magnetic isolation sleeve. The first channel and the second channel are arranged symmetrically with respect to an axis of the magnetic isolation sleeve; the third channel and the fourth channel are arranged symmetrically with respect to the axis of the magnetic isolation sleeve. An accommodation cavity is formed between a bottom end of the magnetic isolation sleeve and a bottom end of the second piston cylinder, a first guiding cavity is formed between the first channel and the piston inner cylinder, a second guiding cavity is formed between the magnetic isolation sleeve and the piston outer cylinder. An end of the first channel is communicated with the first guiding cavity, another end of the first channel is communicated with the accommodation cavity; upper ends of the second channel, the third channel and the fourth channel are all communicated with the second guiding cavity, and lower ends of the second channel, the third channel and the fourth channel are all communicated with the accommodation cavity.

Further, a third piston cylinder is arranged in the first channel, and a third piston is fixedly arranged in the third piston cylinder, a third magnetic induction coil is evenly wound around the third piston in a circumferential direction of the third piston, and a third annular channel through which the magnetorheological fluid flows is formed between the third piston and the third piston cylinder.

Further, the second channel and the first channel are provided with same structure therein.

Further, the lower end of the third channel is provided with a mounting groove, and a one-way flow valve assembly is provided in the mounting groove for opening or closing the third channel.

Further, the one-way flow valve assembly includes a cross-shaped mounting seat fixedly installed in the mounting groove, and a spring connected with the cross-shaped mounting seat and a spring blocking plate connected with the spring. An internal structure of the third channel is identical to that of the fourth channel; an opening of the mounting groove of the third channel and an opening of the mounting groove of the fourth channel are provided with a limit stop rod, and the limit stop rod comprises two circular limit rings and a connecting rod connecting the two limit rings.

Further, the self-sensing and separated dual-cylinder magnetorheological damper includes a mounting base integrally formed with the second piston cylinder, the piston inner cylinder and the piston outer cylinder are fixedly connected to and arranged on the mounting base.

Further, a reinforcing rib plate is arranged between a bottom of the piston outer cylinder and an end of the second piston cylinder, and the reinforcing rib plate is provided with a compensation cylinder assembly for performing volume compensation when the magnetorheological fluid flows. The compensation cylinder assembly comprises a compensation cylinder, a valve core disposed at an end of the compensation cylinder, and a floating piston disposed in the compensation cylinder and moving freely in an axial direction of the compensation cylinder.

Further, an end of the piston inner cylinder, the bottom of the piston outer cylinder, and the end of the second piston cylinder are all provided with diversion holes for circulating the magnetorheological fluid.

Further, the piston rod assembly includes a piston rod, a piston head fixedly connected to the piston rod, and a seal ring arranged on the piston head; a primary coil and a secondary induction coil are arranged on an outer wall of the piston inner cylinder.

The present disclosure has the following beneficial effects.

The present disclosure solves the problem that, with respect to the situation in which the output damping force required under the compression and recovery stroke is not equal when the suspension is in damping match, especially the requirement of the working condition where the rebound force is greater than the compression force, it is difficult for a passive shock absorber to perform large-scale adjustment of compression force and rebound force according to the working conditions, and the magnetorheological damper control algorithm is extremely complex. Compared with debugging of the control algorithm of a single coil, the present disclosure has wider control capability and scope, and better reliability. It can not only use a simple control algorithm to achieve the matching of suspension damping, but also can be used for fast damping matching during the development of new car suspension. Furthermore, according to the different requirements of compression force and rebound force, the current value can be applied in advance, so as to avoid that the response time of the magnetorheological device is different so that the control algorithm cannot be run to apply the current to change the damping force value. Furthermore, the LVDT piston is far away from the magnetorheological coil to prevent the magnetic field coupling from resulting in being difficult to monitor the actual state; by detecting the vibration amplitude of the working condition, a simple control algorithm is designed to control the damper to improve ride comfort.

Before the present disclosure is disclosed and described, it is to be understood that the terminology used herein is only for the purpose of describing particular embodiments, and is not intended to be limiting. The terms "a" or "an" as used herein, are defined as one or more than one. The terms "include" and/or "comprise" as used herein, are defined as comprising (i.e., open language). Also, for purposes of description herein, the terms "upper", "lower", "left", "rear", "right", "front", "vertical", "horizontal" and derivatives thereof relate to the present disclosure as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

BRIEF DESCRIPTION OF THE DRAWINGS

The present disclosure will be further described in combination with the accompanying drawings and the embodiments.

DETAILED DESCRIPTION

Figure 1:
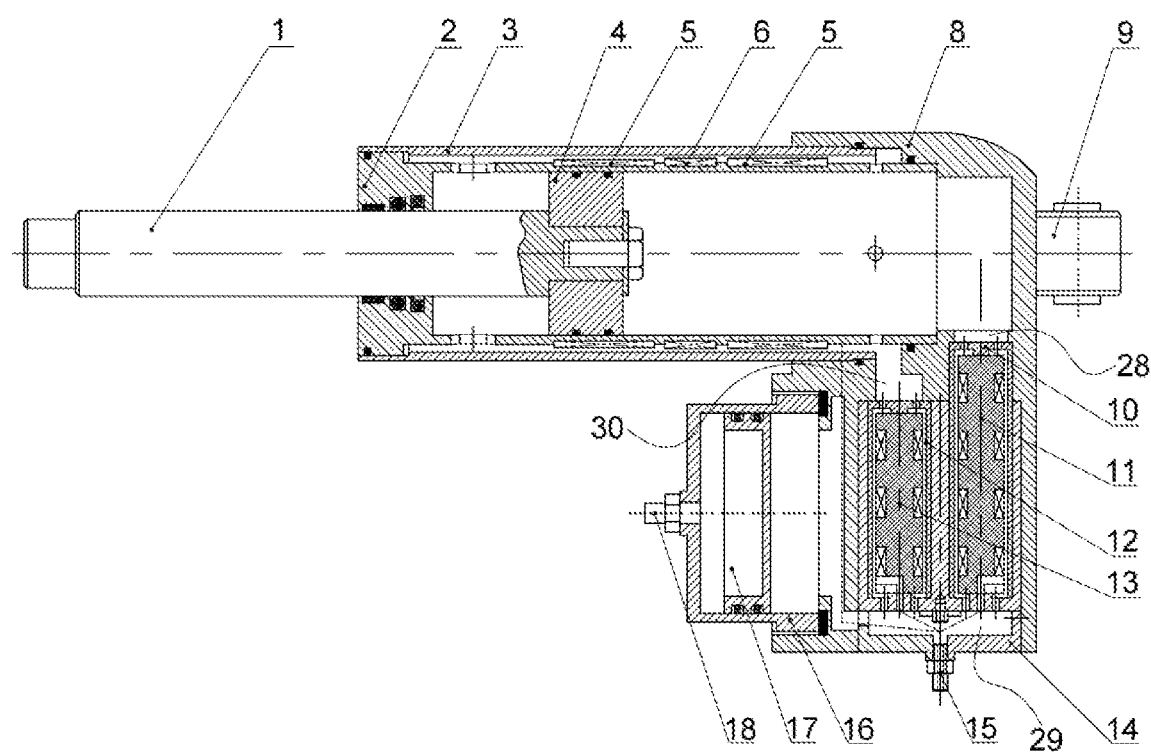
FIG. 1 is a schematic structural diagram according to the present disclosure.
Figure 2:
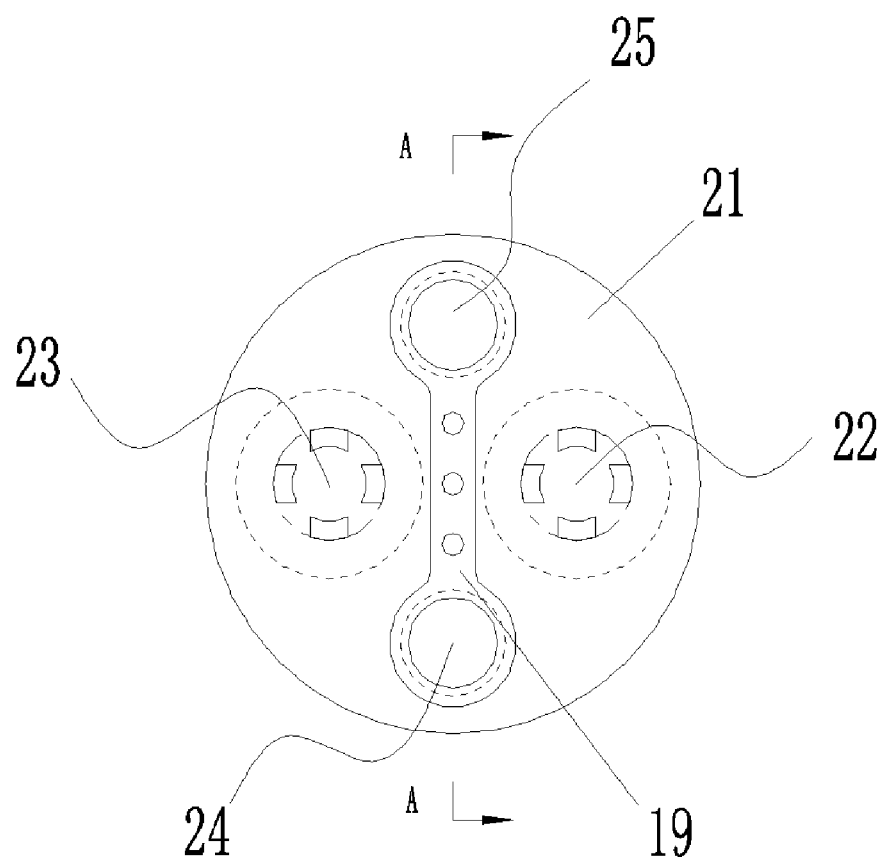
FIG. 2 is a schematic structural diagram of a magnetorheological fluid adjustment mechanism, viewed from an end thereof, according to the present disclosure.
Figure 3:
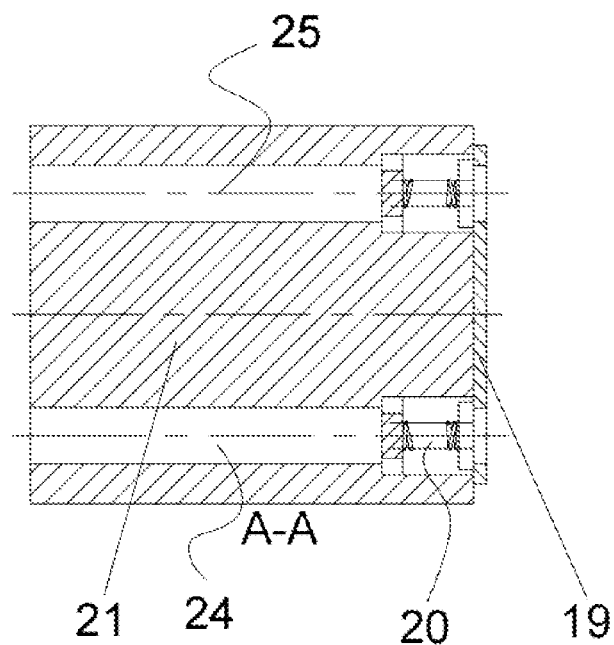
FIG. 3 is a schematic structural diagram along A-A of FIG. 2 according to the present disclosure.
Figure 4:
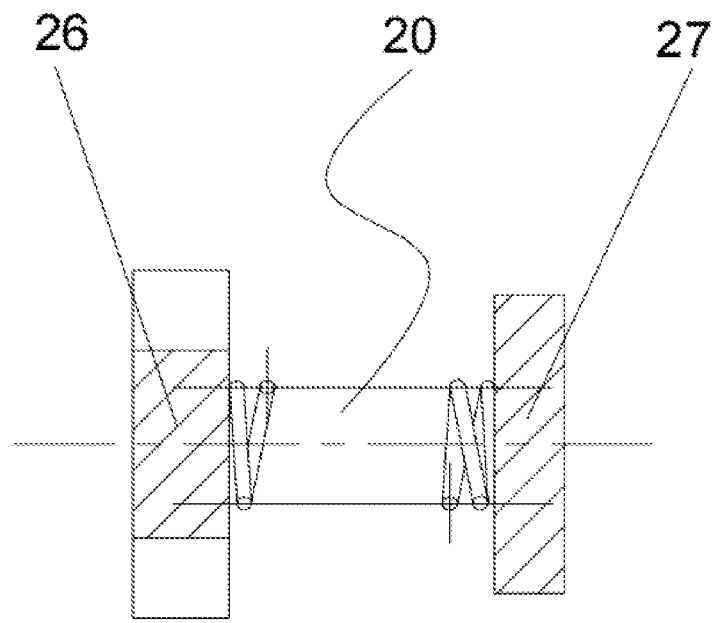
FIG. 4 shows one-way flow valve assembly according to the present disclosure.
Figure 5:
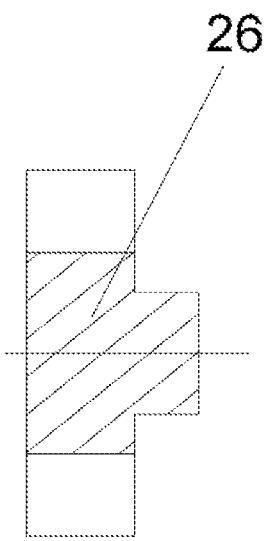
FIG. 5 is a side view of a cross-shaped mounting seat according to the present disclosure.
Figure 6:
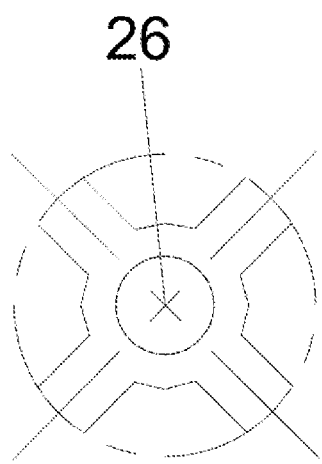
FIG. 6 is a top view of the cross-shaped mounting seat according to the present disclosure.
Figure 7:
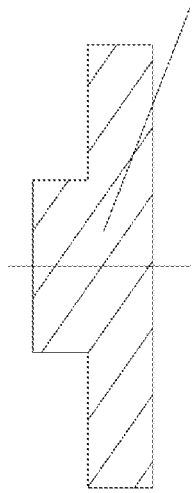
FIG. 7 is a schematic cross-sectional view of a spring blocking plate according to the present disclosure.
Figure 8:
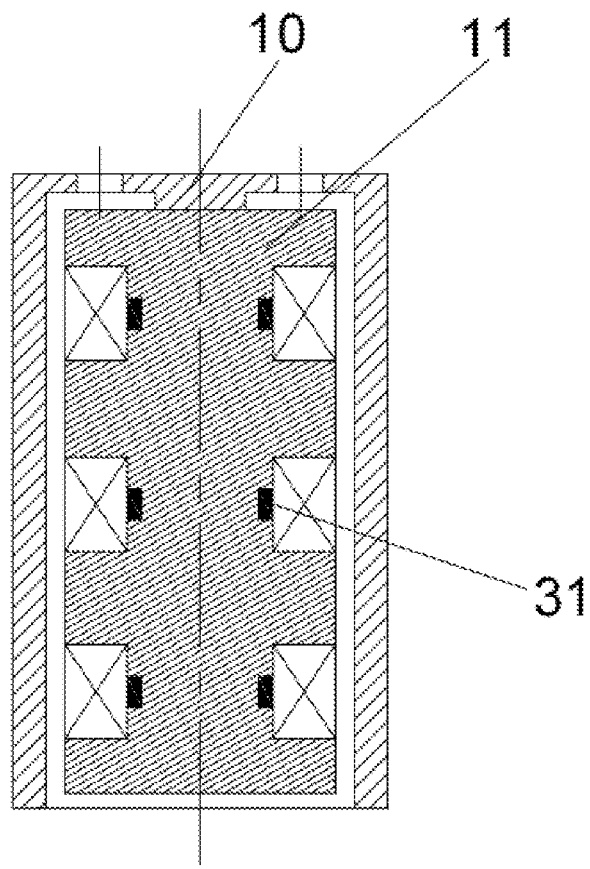
FIG. 8 is a schematic diagram of a second structure of a second channel according to the present disclosure.

FIG. 1 is a schematic structural diagram according to the present disclosure; FIG. 2 is a schematic structural diagram of a magnetorheological fluid adjustment mechanism, viewed from an end thereof, according to the present disclosure; FIG. 3 is a schematic structural diagram along A-A of FIG. 2 according to the present disclosure; FIG. 4 shows one-way flow valve assembly according to the present disclosure; FIG. 5 is a side view of a cross-shaped mounting seat according to the present disclosure; FIG. 6 is a top view of the cross-shaped mounting seat according to the present disclosure; FIG. 7 is a schematic cross-sectional view of a spring blocking plate according to the present disclosure; and FIG. 8 is a schematic diagram of a second structure of a second channel according to the present disclosure. As shown in the above Figs., a self-sensing and separated dual-cylinder magnetorheological damper includes a first piston cylinder and a second piston cylinder which are arranged angularly and in communication with each other. The first piston cylinder includes a piston inner cylinder 2 and a piston outer cylinder 3 which are coaxially provided. The piston inner cylinder 2, the piston outer cylinder 3 and the second piston cylinder are formed with a magnetorheological fluid circulation channel capable of circulating a magnetorheological fluid. The piston inner cylinder 2 is provided with a piston rod assembly 1 capable of reciprocating in an axial direction of the piston inner cylinder, and when the piston rod assembly 1 is compressed and restored, the magnetorheological liquid correspondingly forms a first circulation loop and a second circulation loop respectively. The second piston cylinder is provided therein with a magnetorheological liquid adjustment mechanism for forming the first circulation loop and the second circulation loop. As shown in FIG. 1, a sealing oil seal and a guide ring are provided at a top end of the piston inner cylinder 2 and are used for enhancing sealing performance of the piston inner cylinder 2 and achieving a guide function for the piston rod assembly 1. Optionally the end of the piston inner cylinder 2 can also be sealed by means of a sealing cover. Independent control of damping force values in compression and restoration working conditions can be achieved by means of different circulation channels of the magnetorheological liquid. Furthermore, the device can detect vibration amplitudes and speeds of the working conditions by means of a design of self-sensing LVDT structure away from magnetorheological coils, so as to provide a basis for adjusting the damping force of the damper, and by means of detecting the vibration amplitudes of the working conditions, a simple control algorithm is designed to control the damper to improve the riding comfort.

In this embodiment, the magnetorheological fluid adjustment mechanism includes a magnetic isolation sleeve 21 fixedly disposed in a middle of the second piston cylinder, a first channel 22 disposed in the magnetic isolation sleeve 21, a second channel 23 disposed in the magnetic isolation sleeve 21, a third channel 24 disposed in the magnetic isolation sleeve 21 and a fourth channel 25 in the magnetic isolation sleeve 21. The first channel 22 and the second channel 23 are symmetrically arranged with respect to an axis of the magnetic isolation sleeve 23. The third channel 24 and the fourth channel 25 are arranged symmetrically with respect to the axis of the magnetic isolation sleeve. An accommodation cavity 29 is formed between a bottom end of the magnetic isolation sleeve (the bottom end of the magnetic isolation sleeve is a lower end in a vertical direction in FIG. 1) and a bottom end of the second piston cylinder. A first guiding cavity 28 is formed between a top end of the magnetic isolation sleeve 21 and the piston inner cylinder 2, and a second guiding cavity 30 is formed between a top end of the magnetic isolation sleeve 21 and the piston outer cylinder 3, the first guiding cavity 28 and the second guiding cavity 30 are communicated with each other. One end of the first channel 22 is communicated with the first guiding cavity 28, and the other end of the first channel 22 is communicated with the accommodation cavity 29. Upper ends of the second channel 23, the third channel 24 and the fourth channel 25 are communicated with the second guiding cavity 30. Lower ends of the second channel 23, the third channel 24 and the fourth channel 25 are communicated with the accommodation cavity 29. The magnetic isolation sleeve 21 has a cylindrical structure, and four channels are arranged inside the magnetic isolation sleeve 21. Two ends of the first channel 22 are communicated to the first guiding cavity 28 and the accommodation cavity 29 respectively. When the piston rod assembly 1 is compressed and restored, the magnetorheological fluid selects different channels for circulating flow.

In this embodiment, a third piston cylinder 10 is arranged in the first channel 22, a third piston 11 is fixedly arranged in the third piston cylinder 10, and third magnetic induction coils are evenly wound around the third piston 11 along a circumferential direction. A third annular channel for flow of magnetorheological fluid is formed between the third piston 11 and the third piston cylinder 10. The upper end of the first channel 22 is communicated with the piston inner cylinder 2 through the first guiding cavity 28, and the lower end of the first channel 22 is communicated with the accommodation cavity 29. The same structure is provided inside the second channel 23 and the first channel 22, and a fourth piston cylinder 12 and a fourth piston 13 are correspondingly provided inside the second channel 23. A fourth annular channel is formed between the fourth piston cylinder 12 and the fourth piston 13, and a fourth magnetic induction coil is also arranged around the fourth piston 13 along the circumferential direction. Relative to the components in the first channel 22, the components inside the second channel 23 only differ in length and size.

In this embodiment, a mounting groove is provided at the lower end of the third channel 24, and a one-way flow valve assembly 20 for opening or closing the third channel 24 is arranged in the mounting groove. The structure and arrangement in the third channel 24 are the same as those in the fourth channel 25. The magnetorheological fluid can form different circulation loops through arrangement of the one-way flow valve assembly 20.

In this embodiment, the one-way flow valve assembly 20 includes a cross-shaped mounting seat 26 fixedly installed in the mounting groove, a spring connected to the cross-shaped mounting seat 26, and a spring blocking plate 27 connected to the spring. An internal structure of the third channel 24 is the same as that of the fourth channel 25. A limit stop rod 19 is provided at an opening of the mounting groove of the third channel and at an opening of the mounting groove of the fourth channel. The limit stop rod 19 includes two circular limit rings and a connecting rod connecting the two limit rings. The two limit rings and the connecting rod are formed in one piece, and the limit stop rod 19 is fixedly arranged on the lower end of the magnetic isolation sleeve 21 (i.e. the bottom end of the magnetic isolation sleeve 21). The cross-shaped mounting seat 26 is fixedly arranged inside the mounting groove, and the spring is installed between the boss on the cross-shaped mounting seat 26 and the boss on the spring blocking plate 27. A diameter of the spring blocking plate 27 is larger than that of the limit ring of the limit stop rod 19. When the piston rod assembly 1 is compressed (that is, when the piston rod assembly 1 moves from left to right), the magnetorheological fluid flows through the piston inner cylinder 2, the first guiding cavity 28, the third annular channel, the accommodation cavity 29, the third channel 24 and the fourth channel 25 (at this time, the opening area of the third and fourth channels is 5-10 times the area of the fourth annular channel, due to the throttling effect, the resistance increase, the magnetorheological fluid mainly flows through the third channel and the fourth channel), the second guiding cavity 30, the first annular channel between the piston inner cylinder 2 and the piston outer cylinder 3 in turn, and finally flows into the piston inner cylinder 2. When the piston rod assembly 1 is restored (i.e. when the piston rod assembly 1 moves from right to left), the magnetorheological fluid flows through the first annular channel between the piston inner cylinder 2 and the piston outer cylinder 3, the second guiding cavity 30, the fourth annular channel (the third and fourth channels are closed due to arrangement of the one-way flow valve assembly 20), the accommodation cavity 29, the third annular channel, and the first guiding cavity 28 in turn, and finally flows back into the piston inner cylinder 2.

In this embodiment, the magnetorheological fluid adjustment mechanism also includes a mounting base 8 integrally formed with the second piston cylinder, the piston inner cylinder 2 and the piston outer cylinder 3 are fixedly connected and arranged on the mounting base 8. The bottom of the mounting base 8 is also provided with a lifting lug for mounting, thereby facilitating installation of the equipment. The piston inner cylinder 2 and the piston outer cylinder 3 are all installed in the mounting base 8 in a fixed connection manner.

In this embodiment, a reinforcing rib plate is provided between the bottom of the outer piston cylinder 3 and the end of the second piston cylinder. A compensation cylinder assembly is provided on the reinforcing rib plate for volume compensation when the magnetorheological fluid flows. The compensation cylinder assembly includes a compensation cylinder 16, a valve core 18 disposed at the end of the compensation cylinder 16, and a floating piston 17 disposed in the compensation cylinder 13 and freely movable along the axial direction of the compensation cylinder 13. One end of the reinforcing rib plate is fixedly connected with the bottom end of the piston outer cylinder 3, the other end of the reinforcing rib plate is fixedly connected with the end of the second piston cylinder, and the accommodation cavity 29 is communicated with the compensation cylinder 16, and the compensation cylinder assembly conducts volume compensation for magnetorheological fluid so that the equipment run more smoothly.

In this embodiment, the end of the piston inner cylinder 2, the bottom of the piston outer cylinder 3 (i.e. the horizontal right end), and the end of the second piston cylinder are all provided with diversion holes for circulating flow of the magnetorheological fluid, and the bottom end of the piston inner cylinder 2 is provided with a normal through hole, which enables external characteristic output of the damper to be smoother.

In this embodiment, the piston rod assembly 1 includes a piston rod, a piston head 4 fixedly connected to the piston rod, and a sealing ring arranged on the piston head 4. An outer wall of the piston inner cylinder 2 is provided with a primary coil 6 and a secondary induction coil 5. The bottom end of the second piston cylinder is provided with a sealing end cover 14. Each magnetic induction coil inside the device is drawn out through the sealing end cover 14, and is sealed by the wire sealing structure 15, and the wire sealing structure 15 can adopt existing structures such as an oil seal or a sealing ring, which will not be described here.

In this embodiment, as shown in FIG. 8, a permanent magnet 31 may be added separately to ensure that the magnetorheological damper can also provide shear yield force when no current flows into the damper, thereby improving system stability.

Figure 9:
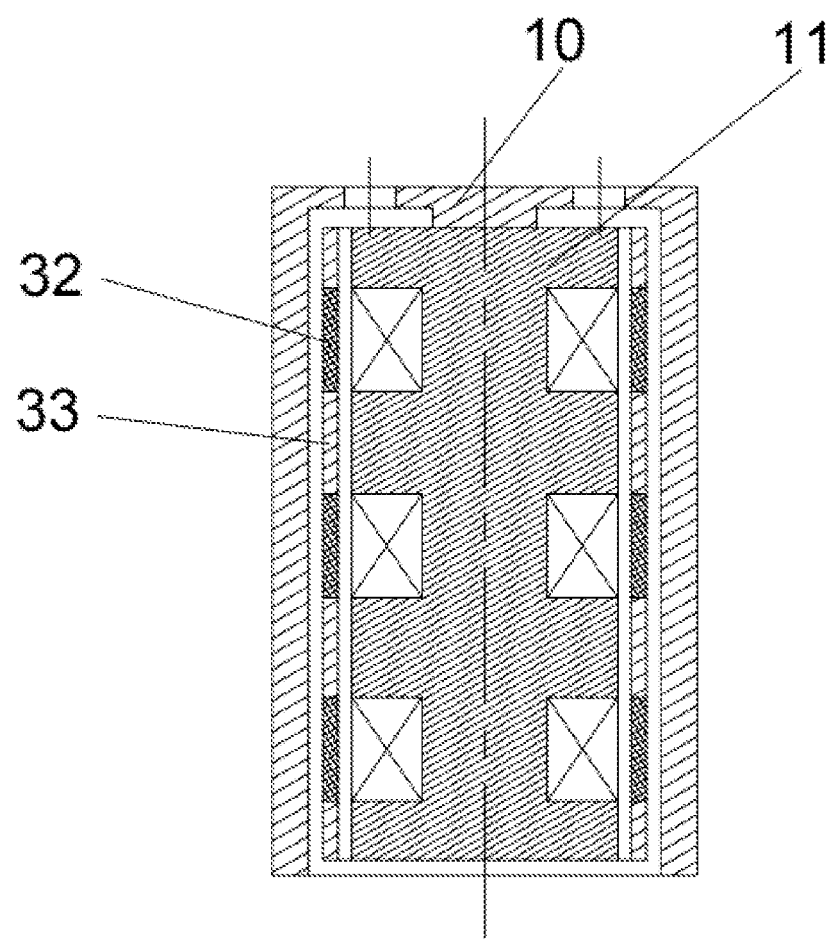
FIG. 9 is a schematic diagram of a third structure of the second channel according to the present disclosure.

In this embodiment, as shown in FIG. 9, a multi-channel ring formed by welding the magnetically conductive material 33 and the non-magnetically conductive material 32 can also be added separately. The multi-channel ring is fixedly connected to the third piston 11, and is configured to reduce the flow velocity of the magnetorheological fluid of the damper under high-speed impact, and ensure that the output damping force of the magnetorheological damper is stable and gentle, thereby reducing the correlation with the impact speed and improving the controllable range.

Figure 10:
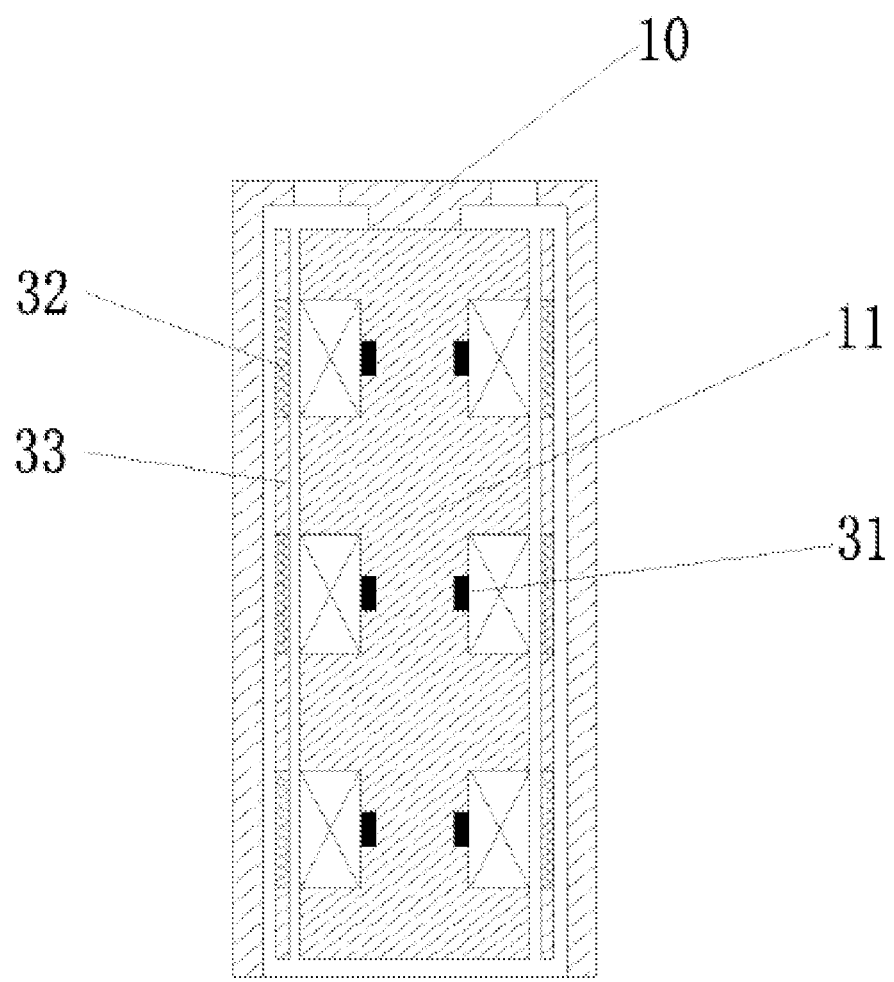
FIG. 10 is a schematic diagram of a fourth structure of the second channel according to the present disclosure

In this embodiment, as shown in FIG. 10, a permanent magnet 31 and a multi-channel ring formed by welding the magnetically conductive material 33 and the non-magnetically conductive material 32 may be added at the same time.

In this embodiment, the internal arrangement structures of the first channel 22 and the second channel 23 may be the same or different, and both can adopt the above different arrangements to improve the performance of the products so as to meet usage requirements.

Finally, it should be noted that the above embodiments are only used to illustrate the technical solutions of the present disclosure and not to limit them. Although the present disclosure has been described in detail with reference to the preferred embodiments, those of ordinary skill in the art should understand that the technical solutions of the present disclosure can be modified or replaced equivalently, without departing from the spirit and scope of the technical solutions of the present disclosure, the modifications or the equivalent replacements should be included in the scope of the claims of the present disclosure.

What is claimed:

1. A self-sensing and separated dual-cylinder magnetorheological damper, comprising a first piston cylinder and a second piston cylinder which are angularly arranged and in communication with each other, wherein:

the first piston cylinder comprises a piston inner cylinder and a piston outer cylinder which are coaxially provided, the piston inner cylinder, the piston outer cylinder and the second piston cylinder are formed with a magnetorheological fluid circulation channel for circulating magnetorheological fluid;

the piston inner cylinder is provided with a piston rod assembly reciprocating in an axial direction of the piston inner cylinder, the magnetorheological liquid forms a first circulation loop when the piston rod assembly is compressed and a second circulation loop respectively when the piston rod assembly is restored, a magnetorheological liquid adjustment mechanism for forming the first circulation loop and the second circulation loop is provided within the second piston cylinder; and the piston rod assembly comprises a piston rod, a piston head fixedly connected to the piston rod, and a seal ring arranged on the piston head, and a primary coil and a secondary induction coil are arranged on an outer wall of the piston inner cylinder.

2. The self-sensing and separated dual-cylinder magnetorheological damper according to claim 1, wherein the magnetorheological fluid adjustment mechanism comprises a magnetic isolation sleeve fixedly arranged in a middle of the second piston cylinder, a first channel arranged within the magnetic isolation sleeve, a second channel disposed in the magnetic isolation sleeve, a third channel disposed in the magnetic isolation sleeve, and a fourth channel disposed in the magnetic isolation sleeve; the first channel and the second channel are arranged symmetrically with respect to an axis of the magnetic isolation sleeve; the third channel and the fourth channel are arranged symmetrically with respect to the axis of the magnetic isolation sleeve; an accommodation cavity is formed between a bottom end of the magnetic isolation sleeve and a bottom end of the second piston cylinder, a first guiding cavity is formed between the first channel and the piston inner cylinder, a second guiding cavity is formed between the magnetic isolation sleeve and the piston outer cylinder; an end of the first channel is communicated with the first guiding cavity, another end of the first channel is communicated with the accommodation cavity; upper ends of the second channel, the third channel and the fourth channel are all communicated with the second guiding cavity, and lower ends of the second channel, the third channel and the fourth channel are all communicated with the accommodation cavity.

3. The self-sensing and separated dual-cylinder magnetorheological damper according to claim 2, wherein a third piston cylinder is arranged in the first channel, and a third piston is fixedly arranged in the third piston cylinder, a third magnetic induction coil is evenly wound around the third piston in a circumferential direction of the third piston, and a third annular channel through which the magnetorheological fluid flows is formed between the third piston and the third piston cylinder.

4. The self-sensing and separated dual-cylinder magnetorheological damper according to claim 3, wherein the second channel and the first channel are provided with same structure therein.

5. The self-sensing and separated dual-cylinder magnetorheological damper according to claim 3, wherein the lower end of the third channel is provided with a mounting groove, and a one-way flow valve assembly is provided in the mounting groove for opening or closing the third channel.

6. The self-sensing and separated dual-cylinder magnetorheological damper according to claim 5, wherein the one-way flow valve assembly comprises a cross-shaped mounting seat fixedly installed in the mounting groove, and a spring connected with the cross-shaped mounting seat and a spring blocking plate connected with the spring, an internal structure of the third channel is identical to that of the fourth channel; an opening of the mounting groove of the third channel and an opening of the mounting groove of the fourth channel are provided with a limit stop rod, the limit stop rod comprises two circular limit rings and a connecting rod connecting the two limit rings.

7. The self-sensing and separated dual-cylinder magnetorheological damper according to claim 1, further comprising a mounting base integrally formed with the second piston cylinder, the piston inner cylinder and the piston outer cylinder are fixedly connected to and arranged on the mounting base.

8. The self-sensing and separated dual-cylinder magnetorheological damper according to claim 7, wherein a reinforcing rib plate is arranged between a bottom of the piston outer cylinder and an end of the second piston cylinder, and the reinforcing rib plate is provided with a compensation cylinder assembly for performing volume compensation when the magnetorheological fluid flows; the compensation cylinder assembly comprises a compensation cylinder, a valve core disposed at an end of the compensation cylinder, and a floating piston disposed in the compensation cylinder and moving freely in an axial direction of the compensation cylinder.

9. The self-sensing and separated dual-cylinder magnetorheological damper according to claim 8, wherein an end of the piston inner cylinder, the bottom of the piston outer cylinder, and the end of the second piston cylinder are provided with diversion holes for circulating the magnetorheological fluid.

10. A self-sensing and separated dual-cylinder magnetorheological damper, comprising a first piston cylinder and a second piston cylinder which are angularly arranged and in communication with each other, wherein:

the first piston cylinder comprises a piston inner cylinder and a piston outer cylinder which are coaxially provided, the piston inner cylinder, the piston outer cylinder and the second piston cylinder are formed with a magnetorheological fluid circulation channel for circulating magnetorheological fluid;

the piston inner cylinder is provided with a piston rod assembly reciprocating in an axial direction of the piston inner cylinder, the magnetorheological liquid forms a first circulation loop when the piston rod assembly is compressed and a second circulation loop respectively when the piston rod assembly is restored, a magnetorheological liquid adjustment mechanism for forming the first circulation loop and the second circulation loop is provided within the second piston cylinder;

the magnetorheological fluid adjustment mechanism comprises a magnetic isolation sleeve fixedly arranged in a middle of the second piston cylinder, a first channel arranged within the magnetic isolation sleeve, a second channel disposed in the magnetic isolation sleeve, a third channel disposed in the magnetic isolation sleeve, and a fourth channel disposed in the magnetic isolation sleeve;

the first channel and the second channel are arranged symmetrically with respect to an axis of the magnetic isolation sleeve;

the third channel and the fourth channel are arranged symmetrically with respect to the axis of the magnetic isolation sleeve;

an accommodation cavity is formed between a bottom end of the magnetic isolation sleeve and a bottom end of the second piston cylinder, a first guiding cavity is formed between the first channel and the piston inner cylinder, a second guiding cavity is formed between the magnetic isolation sleeve and the piston outer cylinder;

an end of the first channel is communicated with the first guiding cavity, another end of the first channel is communicated with the accommodation cavity; and upper ends of the second channel, the third channel and the fourth channel are all communicated with the second guiding cavity, and lower ends of the second channel, the third channel and the fourth channel are all communicated with the accommodation cavity.

\* \* \* \* \*